United States Patent
Kim et al.

(10) Patent No.: US 9,764,732 B2
(45) Date of Patent: Sep. 19, 2017

(54) APPARATUS AND METHOD FOR CONTROLLING ENGINE STOP OF HYBRID ELECTRIC VEHICLE

(71) Applicant: Hyundai Motor Company, Seoul (KR)

(72) Inventors: Sang Joon Kim, Seoul (KR); Jong Bum Oh, Gyeonggi-do (KR); Sung Deok Kim, Gyeonggi-do (KR); Il Kwon Park, Seoul (KR); Seong Ik Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 10 days.

(21) Appl. No.: 14/930,188

(22) Filed: Nov. 2, 2015

(65) Prior Publication Data

US 2016/0288782 A1 Oct. 6, 2016

(30) Foreign Application Priority Data

Mar. 30, 2015 (KR) .................. 10-2015-0043887

(51) Int. Cl.
*B60W 20/17* (2016.01)
*F02N 11/08* (2006.01)
*B60K 6/48* (2007.10)
*B60W 10/08* (2006.01)
(Continued)

(52) U.S. Cl.
CPC .............. *B60W 20/17* (2016.01); *B60K 6/48* (2013.01); *B60K 6/485* (2013.01); *B60W 10/06* (2013.01); *B60W 10/08* (2013.01); *F02N 11/0814* (2013.01); *F02N 11/0862* (2013.01); *B60W 2510/06* (2013.01); *B60W 2710/083* (2013.01);
(Continued)

(58) Field of Classification Search
CPC ...... B60W 20/17; B60W 10/08; B60W 10/06; B60W 2710/244; B60W 2510/06; B60W 2710/083; B60K 6/485; B60K 6/48; F02N 11/0814; F02N 11/0862; Y02T 10/6286; Y02T 10/6221
USPC ........................................... 701/22
See application file for complete search history.

(56) References Cited

U.S. PATENT DOCUMENTS 6,253,127 B1 * 6/2001 Itoyama ................ B60K 6/442
123/179.1
6,558,290 B2 5/2003 Phillips et al.
(Continued)

FOREIGN PATENT DOCUMENTS

JP 2005-009449 A 1/2005
JP 2005-231409 9/2005
(Continued)

*Primary Examiner* — Brian P Sweeney
(74) *Attorney, Agent, or Firm* — Mintz Levin Cohn Ferris Glovsky and Popeo, P.C.; Peter F. Corless

(57) ABSTRACT

An apparatus and method for controlling an engine stop of a hybrid electric vehicle provides an efficient torque in the operation of a hybrid starter generator, by applying a torque of a high efficiency point of the hybrid starter generator according to a drop of engine RPM when the engine is stopped, so as to improve fuel efficiency of a vehicle and damping vibration of the vehicle when the engine is stopped, by generating a negative torque on the hybrid starter generator side in accordance with the drop of the engine RPM when the engine is stopped, and by applying a torque of the point that gives the maximum charging power of the battery through the generated negative torque.

8 Claims, 3 Drawing Sheets

(51) Int. Cl.
*B60W 10/06* (2006.01)
*B60K 6/485* (2007.10)

(52) U.S. Cl.
CPC .... *B60W 2710/244* (2013.01); *Y02T 10/6221* (2013.01); *Y02T 10/6286* (2013.01)

(56) References Cited

U.S. PATENT DOCUMENTS

| | | | |
|---|---|---|---|
| 7,520,353 B2 * | 4/2009 | Severinsky | B60H 1/004 180/65.265 |
| 8,491,441 B2 | 7/2013 | Fukitani | |
| 2005/0096804 A1 * | 5/2005 | Gee | B60K 5/1283 701/22 |
| 2007/0078586 A1 * | 4/2007 | Pallett | B60K 6/445 701/101 |
| 2008/0275601 A1 * | 11/2008 | Saito | B60K 6/48 701/22 |
| 2014/0058605 A1 | 2/2014 | Tagawa et al. | |

FOREIGN PATENT DOCUMENTS

| | | |
|---|---|---|
| JP | 2006-94616 | 4/2006 |
| JP | 2012-158328 | 8/2012 |
| JP | 2013-112265 | 6/2013 |
| JP | 2013-124083 | 6/2013 |
| JP | 2013-184652 A | 9/2013 |
| KR | 10-2009-0062584 A | 6/2009 |

* cited by examiner

CHARGING POWER PER OPERATING POINT IN VIEW OF EFFICIENCY

| TORQUE /SPEED | 0 | 500 | 1000 | 2000 | 4000 | 6000 | 8000 | 10000 | 12000 | 15000 |
|---|---|---|---|---|---|---|---|---|---|---|
| 0 | 0 | 0 | 0 | 0 | 0 | 0 | 0 | 0 | 0 | |
| -5 | 0 | 80 | 81.8 | 87.3 | 88.9 | 89.8 | 89.9 | 88.1 | 86.0 | |
| -10 | 0 | 70 | 76.4 | 86.0 | 90.9 | 92.6 | 93.1 | 91.0 | 68.0 | |
| -15 | 0 | 65 | 71.7 | 84.0 | 90.4 | 92.7 | | | | |
| -20 | 0 | 60 | 65.5 | 81.2 | 89.5 | | | | | |
| -25 | 0 | 55 | 59.7 | 78.4 | | | | | | |
| -30 | 0 | 45 | 52.1 | 74.6 | | | | | | |
| -35 | 0 | 35 | 42.6 | 69.8 | | | | | | |
| -35.3 | 0 | 35 | 40.5 | 68.8 | | | | | | |
| | | | | | | | | | | |

APPARATUS AND METHOD FOR CONTROLLING ENGINE STOP OF HYBRID ELECTRIC VEHICLE

CROSS-REFERENCE TO RELATED APPLICATION

This application claims under 35 U.S.C. §119(a) the benefit of Korean Patent Application No. 10-2015-0043887 filed on Mar. 30, 2015, the entire contents of which are incorporated herein by reference.

BACKGROUND (a) Technical Field

The present invention relates to an apparatus and a method for controlling an engine stop of a hybrid vehicle, more particularly, to an apparatus and a method for controlling an engine stop of a hybrid vehicle configured to quickly avoid a vibration occurring through a resonance region of an engine and to charge a battery while generating a negative torque, when the negative torque is generated using a hybrid starter generator which is connected to the engine side so as to lower rpm of the engine.

(b) Description of the Related Art

A hybrid vehicle is a vehicle that uses an engine and a motor as power sources to improve fuel efficiency, and is configured to include the engine, a driving motor, a battery, and a control unit. The hybrid vehicle includes an inverter for operating these elements, and a hybrid starter generator connected to a crank pulley of the engine in series with the engine, a motor pulley, and a belt. In the case of a generator connected to the motor pulley of the engine in series, it typically includes a hybrid starter generator, and the torque generated by the hybrid starter generator is capable of charging the battery via an inverter.

A control unit of the hybrid vehicle includes an engine control unit (ECU) that controls the engine, a motor control unit (MCU) that controls the hybrid starter generator, a transmission control unit (TCU), and a battery management system (BMS) that manages the state of the battery. The control unit further includes a hybrid control unit (HCU) that performs overall control of the respective control units mentioned above.

A main driving mode of a hybrid vehicle based on such a configuration includes, as is well known, an EV (electric vehicle) mode as a pure electric vehicle mode using only the motor power, a HEV (hybrid electric vehicle) mode as an auxiliary mode using the rotational force of the motor as auxiliary power, while using the rotational force of the engine as the main power, and a regenerative braking (RB) mode that recovers the braking and inertial energy of the vehicle during driving of the vehicle by the braking and inertia of the vehicle through the electric generation in the motor to charge the battery.

In particular, a hybrid vehicle has an idle stop (which is a function of stopping the engine during idling when the vehicle is stopped to improve the fuel economy) so as to improve fuel economy and exhaust performance. The idle stop mode refers to a process of improving the fuel economy and/or exhaust performance by preventing unnecessary engine idling, as one of several techniques for improving the fuel economy and/or exhaust performance of the hybrid vehicle.

The operation and entry of the idle stop mode are processes of forcibly stopping the engine, which has a rotation speed measured in revolutions per minute, such that when the engine is stopped it passes through a resonance region of the engine. Further, when performing a frequent engine stop, it is important to reduce the vibration generated in the engine resonance region.

As a related art, Japanese Patent Publication No. 2013-112265 discloses a technique for generating a negative torque in a traveling hybrid starter generator during automatic stop of the engine, and discloses an apparatus for controlling an engine stop of a hybrid vehicle that performs feedback control depending on the rotational speed profile of the hybrid starter generator that has been set in advance when the engine is automatically stopped.

However, as described above, when performing the control for avoiding an engine resonance region by setting the constant rotation speed, the charging energy of torque generated in the engine is not considered, and there is a problem in terms of fuel efficiency.

Further, upon performing the engine stop, depending on the constant rotational speed of the hybrid starter generator, it is difficult to perform the rapid avoidance of the resonance region when the engine is stopped, and there is a need for operation control of the hybrid starter generator in accordance with the high-efficiency torque of the hybrid starter generator.

FIG. 1 (RELATED ART) shows an operating point of a hybrid starter generator which is connected to an engine when the engine of the hybrid vehicle is stopped, according to the related art.

As shown in FIG. 1, according to the related art, feedback control for following the target speed of the hybrid starter generator is performed when the engine of the hybrid vehicle is stopped, which generates a low negative torque. Thus, when setting the following speed of the hybrid starter generator and executing the feedback control to reach the speed, there is a problem of losing the charging energy of the battery which is generated from the torque of the hybrid starter generator.

Also, in the case of executing the feedback control for following the target speed of the hybrid starter generator when the engine is stopped, there is a problem in which the vibration of the vehicle is generated by quickly avoiding the engine resonance region.

The above information disclosed in this Background section is only for enhancement of understanding of the background of the invention and therefore it may contain information that does not form the prior art that is already known in this country to a person of ordinary skill in the art.

SUMMARY

An object of the present invention is to provide an efficient torque in the operation of the hybrid starter generator in consideration of the efficiency of the hybrid starter generator and the high-voltage battery due to drop of the engine RPM when the engine is stopped.

Since a negative torque is generated on the hybrid starter generator side depending on the drop of the engine RPM when the engine is stopped, the present invention provides a method of applying torque of a point that gives a maximum charging power of the battery through the generated negative torque.

Objects of the present invention are not limited to those mentioned above, and other objects of the present invention that have not been mentioned can be understood by the following description and can be more clearly understood by examples of the present invention.

In one aspect, the present invention provides an apparatus for controlling an engine stop of a hybrid vehicle, the apparatus including: an engine that provides output to the hybrid vehicle; a hybrid starter generator configured to absorb engine torque; a battery connected to the hybrid starter generator; and a control unit for controlling whether the engine is driven and the torque generation of the hybrid starter generator, wherein the control unit executes a negative torque command of the hybrid starter generator to stop the engine by absorbing the engine torque, and the control unit sets the profile so that the magnitude of the instantaneous charging energy becomes maximum in view of the hybrid starter generator efficiency and an efficiency of the battery depending on the engine RPM, and provides the torque of the hybrid starter generator depending on the profile.

In a preferred embodiment, the control unit executes charging of the battery connected to the hybrid starter generator, upon performing a negative torque command of the hybrid starter generator so as to absorb the engine torque.

In another preferred embodiment, the apparatus further includes an electronic engine mount for damping vibration when the engine is stopped.

In still another preferred embodiment, the control unit controls the vibration of the vehicle by interlocking the quantity of vibration damping in the electronic engine mount with the quantity of negative torque provided from the hybrid starter generator.

In another aspect, the present invention provides a method for controlling an engine stop of a hybrid vehicle, the method including: determining whether an engine power drive shaft is disconnected and the fuel injection of an engine is stopped when the engine of the hybrid vehicle is stopped; generating a negative torque in the hybrid starter generator depending on a profile set so that a magnitude of an instantaneous charging energy of the battery becomes maximum, in view of the hybrid starter generator efficiency and the battery efficiency depending on the engine RPM when the engine power drive shaft is disconnected and fuel injection of the engine is stopped; and determining whether the engine RPM is less than a preset reference value by the generated torque of the hybrid starter generator.

In a preferred embodiment, the method further includes executing charging of a battery connected to the hybrid starter generator, in generating the negative torque in the hybrid starter generator.

In another preferred embodiment, the method further includes damping the vibration when the engine is stopped through an electronic engine mount, in generating the negative torque in the hybrid starter generator.

In still another preferred embodiment, the method further includes controlling the vibration of the vehicle by interlocking a quantity of vibration damping of the electronic engine mount with a quantity of negative torque provided by the hybrid starter generator.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
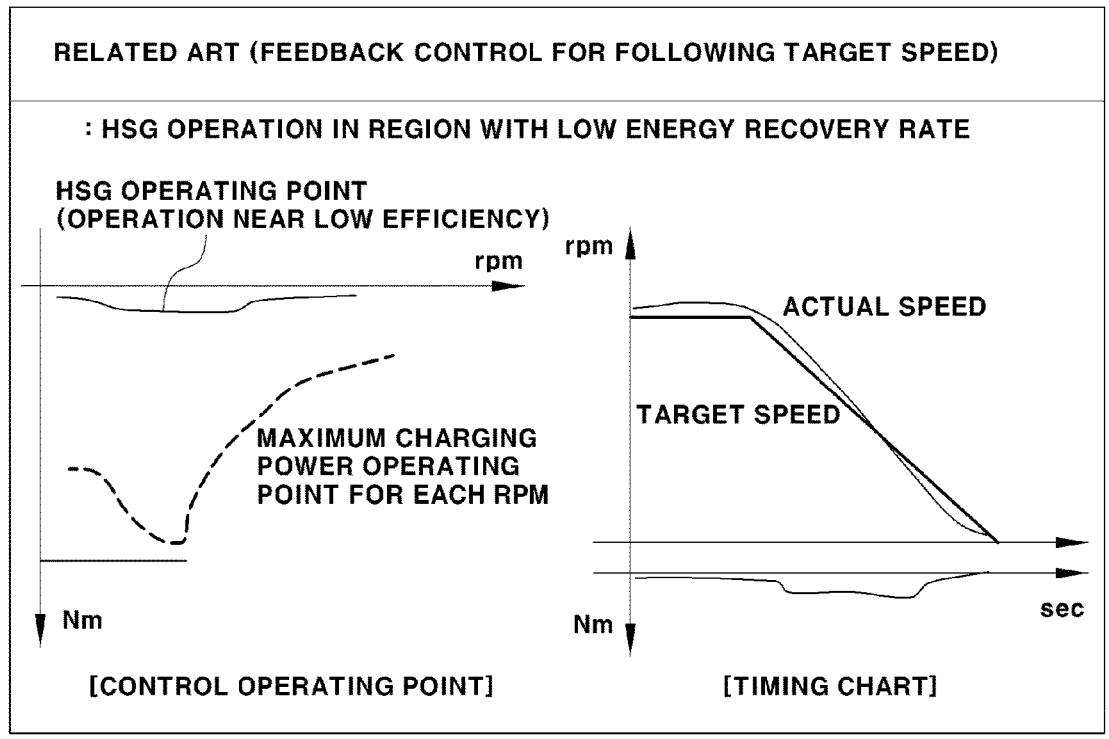
FIG. 1 (RELATED ART) shows a control operating point when the engine of a hybrid vehicle is stopped, according to the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an embodiment of the present invention will be described in more detail referring to the accompanying drawings. The embodiments of the present invention can be modified in various forms, and the scope of the invention should not be construed as being limited to the following embodiments. The embodiments are provided to more fully illustrate the present invention to those who have an average knowledge in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention provides an efficient torque in the operation of a hybrid starter generator, by applying a torque of a high efficiency point of the hybrid starter generator according to a drop of RPM.

Further, the present invention applies a torque of maximum charging efficiency of the battery and high efficiency point of the hybrid starter generator, which provides an improvement in fuel economy of the vehicle.

Figure 2:
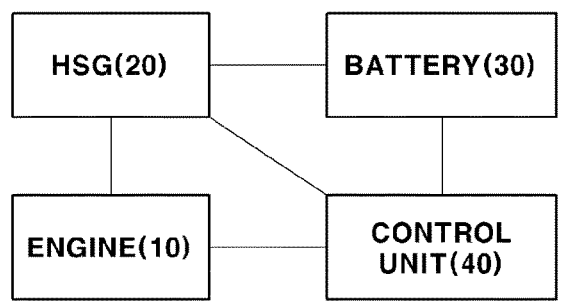
FIG. 2 shows a block diagram of an apparatus for controlling an engine stop of a hybrid vehicle of the present invention.

FIG. 2 shows a block diagram of an apparatus for controlling an engine stop of a hybrid vehicle as an embodiment of the present invention.

The apparatus includes an engine that provides a driving force of the hybrid vehicle, and the engine includes a battery that is connected to a hybrid starter generator (HSG) and is charged when a negative torque of the hybrid starter generator (HSG) is applied. Further, the control unit of the hybrid vehicle that performs the control of the above configurations includes an engine control unit (ECU) that controls the engine, a motor control unit (MCU) that controls the hybrid starter generator, a transmission control unit (TCU), and a battery management system (BMS) that manages the state of the battery.

Further, the apparatus further includes a hybrid control unit (HCU) which performs an overall control of the above-mentioned respective control units.

In a preferred embodiment of the present invention, the hybrid starter generator (HSG) that provides a driving force of the hybrid vehicle performs the function of a generator, is configured by being connected to an engine pulley, and is configured to charge the battery connected to an inverter according to the drive of the engine.

In another embodiment, it is possible to configure a hybrid starter generator (HSG) distinguished from a driving motor connected to a drive shaft of the vehicle and a transmission, and the hybrid starter generator (HSG) is connected to a pulley of the engine to generate energy, and can charge the battery by utilizing the energy generated by the hybrid starter generator through the inverter.

As described above, the hybrid starter generator (HSG) is operated such that negative torque control commands of the HCU absorb the engine torque, thereby being able to reduce an occurrence of vibration during stopping of the engine and aid absorption of the engine torque.

Figures 3, 4:
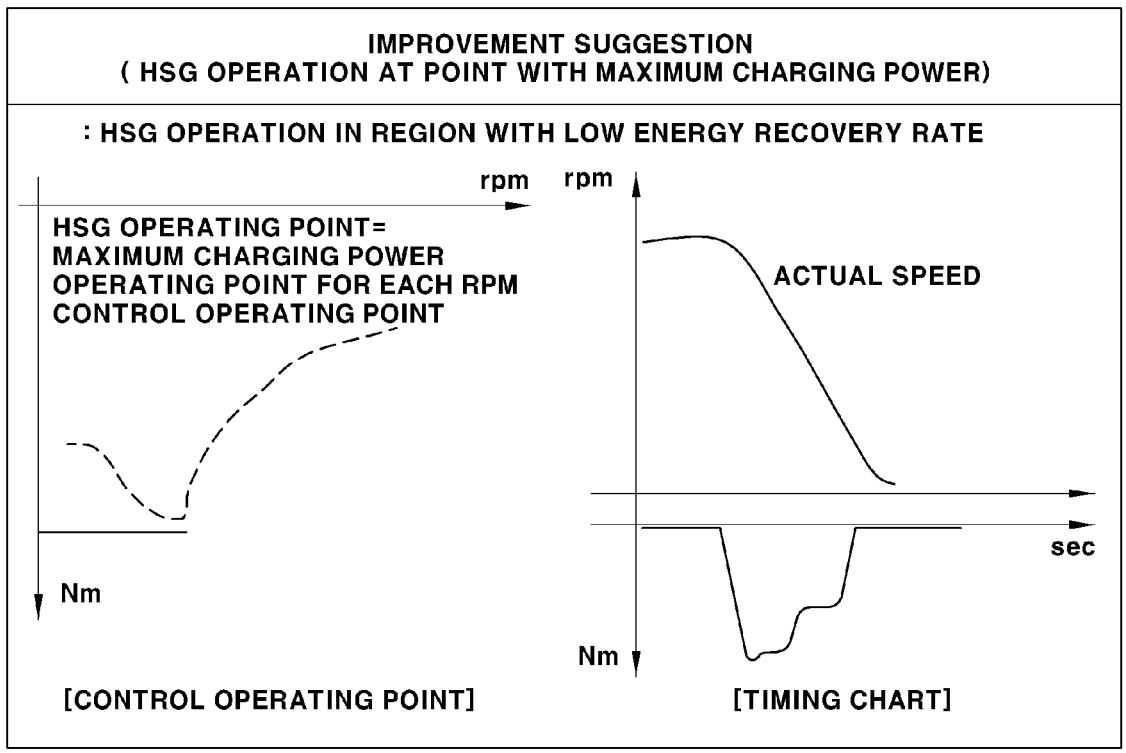
FIG. 3 showing a hybrid starter generator control operating point so that a magnitude of an instantaneous charging energy becomes maximum in view of the efficiency of the battery of the present invention.
FIG. 4 shows a relationship between torque and speed during the hybrid starter generator control operation when the engine is stopped according to the maximum charging energy of the battery of the present invention.

FIG. 3 shows a profile in which the energy of the battery charged by the hybrid starter generator (HSG) according to the negative torque control command of the hybrid starter generator is maximized in the control unit.

As illustrated above, a profile of the form of generating a negative torque of the hybrid starter generator according to the maximum charging energy operating point of the battery for each RPM is included, and the profile is formed so that the maximum charging energy of the battery is provided.

Thus, the point at which the energy of the battery charged by the hybrid starter generator according to engine RPM is maximum is an operating point at which the charging power of the battery becomes instantaneously maximum, and the accumulated energy is charged to the battery becomes maximum in a section in which the negative torque occurs.

Figure 5:
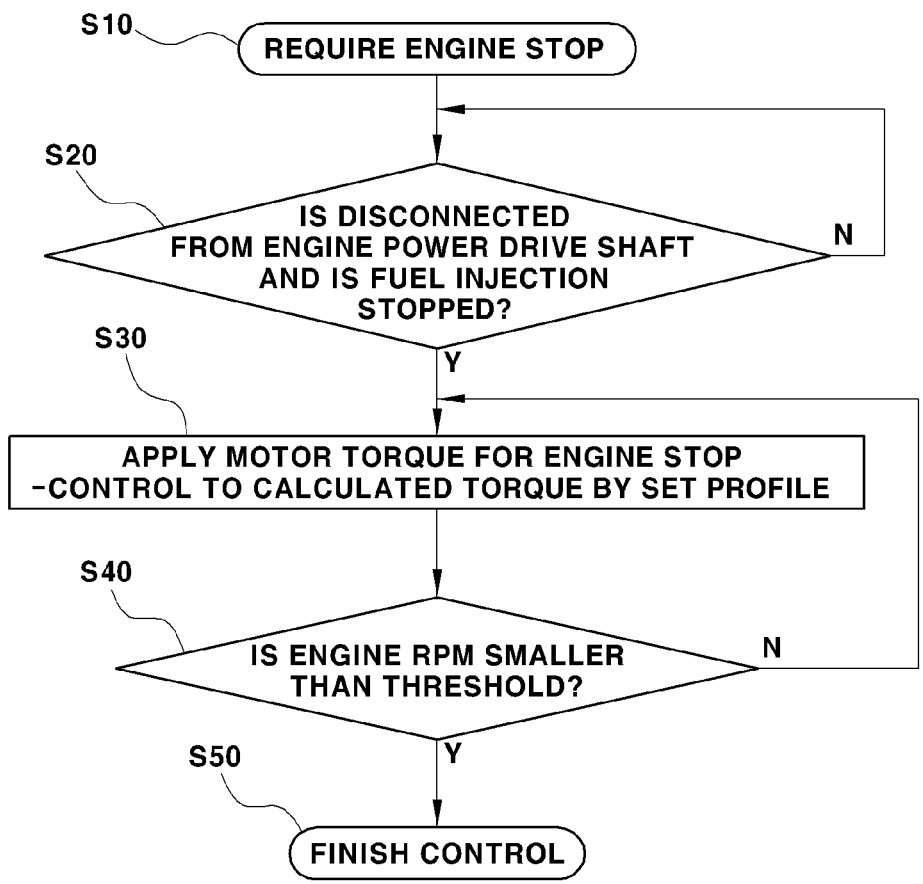
FIG. 5 shows a method of performing an engine stop of the hybrid vehicle of the invention in a flow chart.

FIG. 5 shows a negative torque operating point at which the maximum charging energy of the battery is provided according to the engine lowering speed (hybrid starter generator lowering speed) by a table. In general, it has a maximum torque amount (absolute value) at 2000 RPM and shows values of the form which converges to −10 (torque/speed) as the engine RPM increases.

As described above, in the case of the negative torque generation profile of the hybrid starter generator that provides the maximum charging energy, the battery is charged by utilizing the energy generated when stopping the engine, and it performs a function of converting the driving force used up to the stop of the engine into the charging energy of the battery. Thus, since the battery is charged by utilizing the output generated up to the stop of the engine in the electric mode traveling phase of the hybrid vehicle, there is an effect of improving the fuel efficiency.

The foregoing detailed description illustrates the present invention as an example. Furthermore, the above-mentioned contents show a preferred embodiment of the present invention, and the present invention can be used in various other combinations and modifications and environments. That is, the present invention can be changed or modified within the scope of the concept of the invention disclosed herein, the scope equivalent to the disclosed contents and/or a scope of technique or knowledge of the art. The described embodiments explain the best condition for implementing the technical idea of the present invention, and various modifications required by the specific application fields and applications of the present invention are also possible. The detailed description of the invention, therefore, is not intended to limit the invention to the disclosed exemplary state. Furthermore, the appended claims should be construed as being also includes other implementations.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A control unit of an apparatus comprising an engine that provides output to a hybrid vehicle; a hybrid starter generator configured to absorb engine torque; and a battery connected to the hybrid starter generator, wherein the control unit for controlling an engine stop of a hybrid vehicle is configured to:

control whether the engine is driven, and the torque generation of the hybrid starter generator;

execute a negative torque command of the hybrid starter generator to stop the engine by absorbing the engine torque during stopping of the engine;

set a profile so that a magnitude of an instantaneous charging energy becomes maximum as a result of a hybrid starter generator efficiency and an efficiency of the battery depending on an engine RPM; and provide the torque of the hybrid starter generator depending on the profile.

2. The control unit of claim 1, wherein the control unit executes charging of the battery connected to the hybrid starter generator when performing the negative torque command of the hybrid starter generator so as to absorb the engine torque.

3. The control unit of claim 1, wherein the apparatus further includes:

an electronic engine mount for damping vibration when the engine is stopped.

4. The control unit of claim 3, wherein the control unit controls the vibration of the vehicle, by interlocking a quantity of vibration damping of the electronic engine mount with a quantity of the negative torque provided from the hybrid starter generator.

5. A method for controlling an engine stop of a hybrid vehicle, the method comprising the steps of:

determining, by a control unit, whether an engine power drive shaft is disconnected and a fuel injection of the engine is stopped when an engine of the hybrid vehicle is stopped;

generating, by the control unit, a negative torque in the hybrid starter generator, depending on a profile that is set so that a magnitude of an instantaneous charging energy of the battery becomes maximum, as a result of a hybrid starter generator efficiency and a battery efficiency depending on an engine RPM when the engine power drive shaft is disconnected and the fuel injection of the engine is stopped; and determining, by the control unit, whether the engine RPM is less than a preset reference value by the generated torque of the hybrid starter generator.

6. The method of claim 5, wherein the step of generating the negative torque further comprises:

executing, by the control unit, charging of a battery connected to the hybrid starter generator.

7. The method of claim 5, wherein the step of generating the negative torque further comprises:

damping, by the control unit, a vibration when the engine is stopped through an electronic engine mount.

8. The method of claim 7, further comprising the step of:

controlling, by the control unit, the vibration of the vehicle, by interlocking a quantity of vibration damping of the electronic engine mount with a quantity of negative torque provided by the hybrid starter generator.

* * * * *